United States Patent
Kakimoto et al.

[11] Patent Number: 5,813,381
[45] Date of Patent: Sep. 29, 1998

[54] HARNESS HOLDER FIXING STRUCTURE IN ENGINE

[75] Inventors: Kazuhito Kakimoto; Shigeru Maruyama; Yoshiaki Koyama, all of Saitama, Japan

[73] Assignee: Honda Giken Kogyo Kabushiki Kaisha, Tokyo, Japan

[21] Appl. No.: 827,720

[22] Filed: Apr. 8, 1997

[30] Foreign Application Priority Data

Apr. 12, 1996 [JP] Japan ................................ 8-091510

[51] Int. Cl.[6] ............................. F02D 45/00; F02B 77/00
[52] U.S. Cl. ................................. 123/195 A; 123/195 E; 123/195 C
[58] Field of Search ........................ 123/195 A, 195 C, 123/195 E, 198 E

[56] References Cited

U.S. PATENT DOCUMENTS

| | | | |
|---|---|---|---|
| 4,508,072 | 4/1985 | Takami et al. ................. | 123/195 A |
| 5,060,625 | 10/1991 | Bruning ........................... | 123/195 E |
| 5,203,292 | 4/1993 | Motose ............................ | 123/195 E |
| 5,568,794 | 10/1996 | Tabuchi et al. ................. | 123/195 E |

FOREIGN PATENT DOCUMENTS

| | | | |
|---|---|---|---|
| 444451 | 4/1992 | Japan . | |
| 2181784 | 4/1987 | United Kingdom | 123/195 E |

*Primary Examiner*—Weilun Lo
*Attorney, Agent, or Firm*—Weiner, Carrier, Burt & Esser, P.C.; Joseph P. Carrier

[57] ABSTRACT

A harness holder is disposed to extend along the inside of a cover member which covers a driving pulley and a timing belt, and a harness extending from a crank angle sensor is supported in the harness holder and prevented from contacting the belt and/or pulley. A locking claw projectingly provided at an end of the harness holder is fitted into a grommet mounted on the cover member to guide the harness 21 to the outside of the cover member. Thus, a fixing device such as a bolt for fixing the harness holder can be eliminated and moreover, a tip end of the locking claw can be visually observed from the outside of the cover member to confirm the mounted state of the harness holder.

20 Claims, 10 Drawing Sheets

HARNESS HOLDER FIXING STRUCTURE IN ENGINE

BACKGROUND OF THE INVENTION

1. Field of the Invention

The present invention relates to an engine including a harness disposed to extend inside and outside a cover member which covers a driving-force transmitting means for transmitting a driving force of a crankshaft, and particularly, to a harness holder fixing structure in the engine.

2. Description of the Related Art

An engine revolution detecting device is described in Japanese Utility Model Application Laid-open No. 4-44451, in which an engine-revolution sensor and a crank angle sensor are disposed so that they are opposed to teeth of a driving pulley mounted at an axial end of a crank shaft of the engine, and a harness extending from the sensors is passed in the vicinity of a timing belt reeved around the driving pulley and drawn to the outside.

In the above known arrangement, however, the harness is not fixed in the vicinity of the timing belt and for this reason, there is a possibility that if the position of the harness is displaced, the harness may come into contact with the driving-force transmitting means such as the timing belt and the like. Thereupon, it is conceived that the harness may be fixed by a harness holder and thus prevented from contacting the driving-force transmitting means. However, in general, the driving-force transmitting means, such as the driving pulley and the timing belt, is disposed inside a cover member. Therefore, the following problem is encountered: if an attempt is made to fix the harness holder in a narrow space within the cover member by a fixing means such as a bolt, such attempt not only increases the number of parts involved in securing the harness to the engine, but also the process of assembling the engine structure becomes more difficult.

SUMMARY OF THE INVENTION

Accordingly, it is an object of the present invention to reliably support the harness using a simple structure and to prevent the contact of the harness with the driving-force transmitting means.

To achieve the above object, according to the present invention, there is provided a harness holder fixing structure in an engine in which a harness is disposed to extend inside and outside a cover member which covers a driving-force transmitting means for transmitting a driving force of a crankshaft, wherein the harness holder fixing structure comprises a harness holder mounted within the cover member for supporting the harness and a locking portion for engaging the cover member provided to the harness holder.

With the above construction, the harness holder for supporting the harness is mounted within the cover member and therefore, it is possible to reliably support the harness within the cover member to prevent it from contacting the driving-force transmitting means. In addition, the locking portion for engaging the cover member is provided on the harness holder and therefore, a special fixing member such as a bolt required to fix the harness holder can be eliminated to make the engine compact and to facilitate the assembly.

The above and other objects, features and advantages of the invention will become apparent from the following detailed description of the preferred embodiments taken in conjunction with the accompanying drawings.

BRIEF DESCRIPTION OF THE DRAWINGS

FIGS. 1 to 10 illustrate a first, presently preferred embodiment of the present invention, wherein

DETAILED DESCRIPTION OF THE PREFERRED EMBODIMENTS

A first preferred embodiment of the present invention will now be described with reference to FIGS. 1 to 10.

Figure 1:
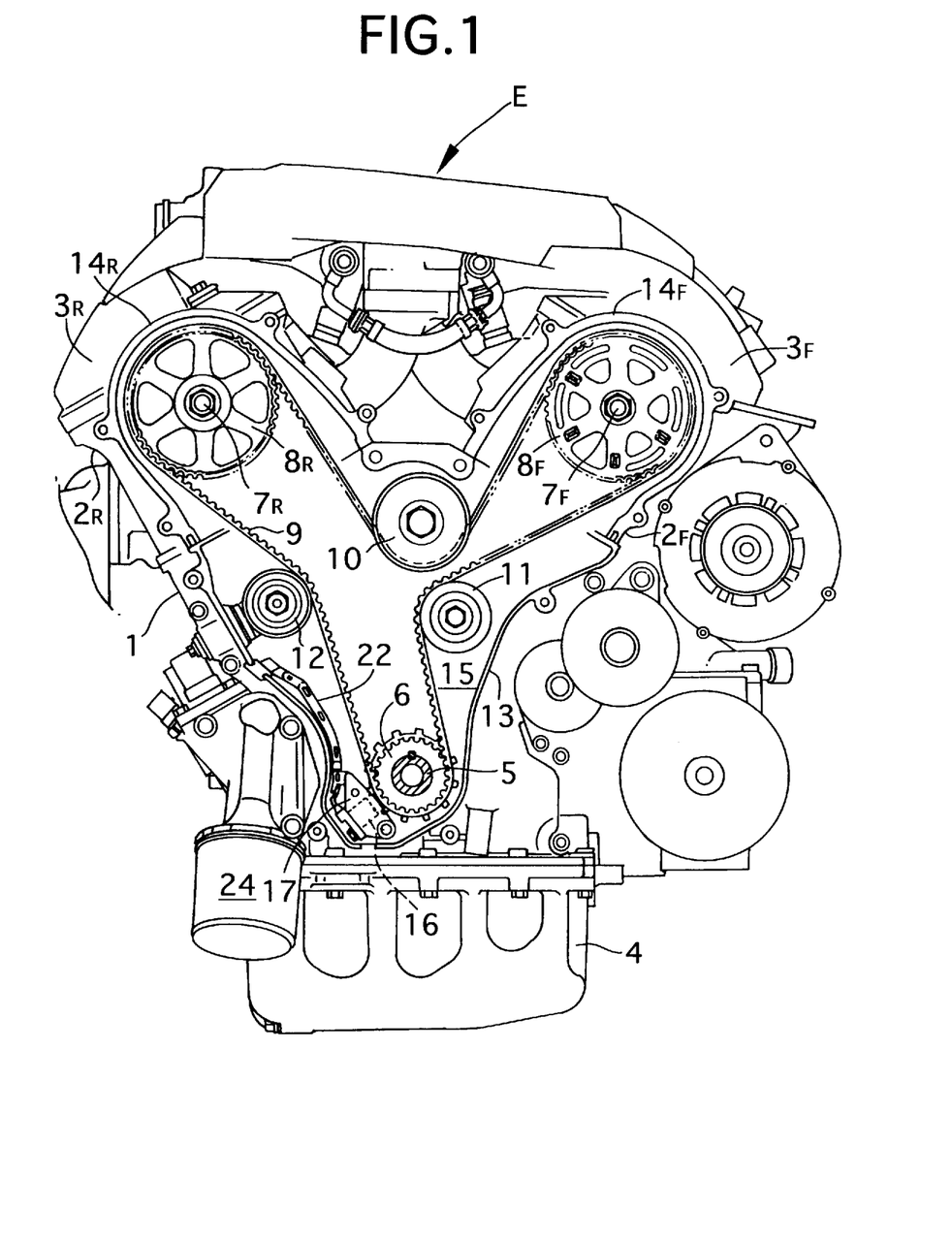
FIG. 1 is a view showing a V-shaped multi-cylinder engine in a state in which a timing belt cover is removed.
Figure 2:
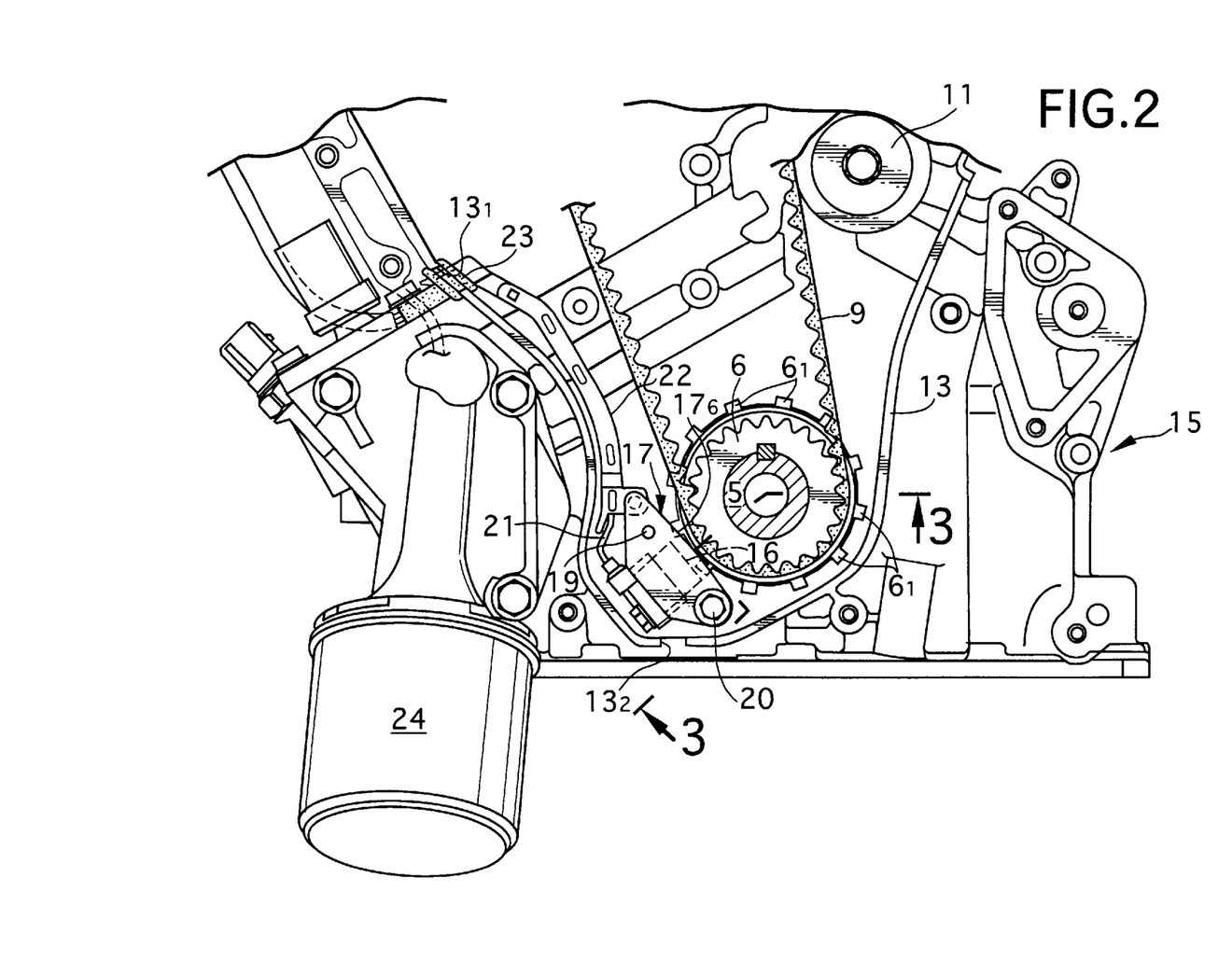
FIG. 2 is an enlarged view of an essential portion of FIG. 1.
Figure 3:
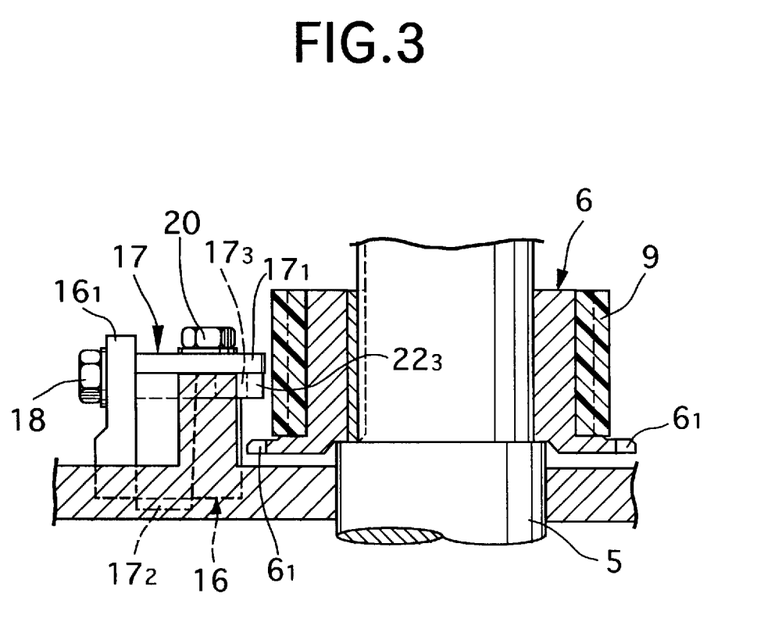
FIG. 3 is a sectional view taken along a line 3—3 in FIG. 2.

Referring to FIG. 1, a V-shaped multi-cylinder engine E includes a cylinder block 1 having a crankcase integrally provided thereon, a pair of front and rear cylinder heads $2_F$ and $2_R$ coupled to an upper portion of the cylinder block 1, a pair of front and rear head covers $3_F$ and $3_R$ coupled to upper portions of the respective cylinder heads $2_F$ and $2_R$, and an oil pan 4 coupled to a lower surface of the cylinder block 1. A timing belt 9 comprised of a belt having a cog is reeved around a driving pulley 6 mounted at an axial end of a crankshaft 5 supported in the cylinder block 1, and cam pulleys $8_F$ and $8_R$ mounted at axial ends of cam shafts $7_F$ and $7_R$ supported in the respective cylinder heads $2_F$ and $2_R$. Two guide pulleys 10 and 11 and a single tension pulley 12 are in abutment against an outer surface of the timing belt 9. Rib-like timing belt cover coupling portions 13, $14_F$ and $14_R$ are projectingly provided to an oil pump body 15 and the cylinder heads $2_F$ and $2_R$ coupled to the cylinder block 1, and are coupled to a timing belt cover 25 (see FIG. 5) which covers the timing belt 9. In the present embodiment, the driving pulley 6 and the timing belt 9 constitute a driving-force transmitting means, and the timing belt cover coupling portion 13 and the timing belt cover 25 constitute a cover member.

As shown in FIGS. 2 to 8, a crank angle sensor 16 for detecting the phase of the crankshaft 5 is mounted between the timing belt cover coupling portion 13 formed on the oil pump body 15 and the driving pulley 6. Twelve detected projections $6_1$ are provided at distances of 30° therebetween around an outer periphery of the driving pulley 6, to which the crank angle sensor 16 is opposed, so as to radially project therefrom. A sensor holder 17 made of a synthetic resin for supporting the crank angle sensor 16 includes a substantially trapezoidal base plate $17_1$. A pair of legs $17_2$, $17_2$ and a locking pin $17_3$ are projectingly provided on a lower surface of the base plate $17_1$, and a pin bore $17_4$ and a bolt bore $17_5$ are provided through the base plate $17_1$.

The crank angle sensor 16 is fastened to an end face of the base plate $17_1$ of the sensor holder 17 by a bolt 18 passing through a mounting flange $16_1$ in a condition in which the crank angle sensor 16 is clamped between the pair of legs $17_2$, $17_2$ of the sensor holder 17. The sensor holder 17 is fastened to the oil pump body 15 by threadedly inserting a bolt 20 passing through the bolt bore $17_5$ in the sensor holder 17 into a bolt bore $15_2$ defined in the oil pump body 15 in a condition in which a positioning pin 19 is fitted into the pin bore $17_4$ in the sensor holder 17 and a pin bore $15_1$ defined in a wall surface of the oil pump body 15.

The harness 21 comprised of two lead wires extending from the crank angle sensor 16 is drawn to the outside of the engine E through a notch $13_1$ defined in the timing belt cover coupling portion 13 leftwardly of and above the crankshaft 5. A harness holder 22 made of a synthetic resin for supporting the harness 21 while preventing the harness 21 from contacting with the driving-force transmitting means is disposed to extend along an inner wall surface of the timing belt cover coupling portion 13 from the crank angle sensor 16 to the notch $13_1$ in the timing belt cover coupling portion 13.

The harness holder 22 curves in an arcuate shape to extend along the inner wall surface of the timing belt cover coupling portion 13 which curves in an arcuate shape. The cross section of the harness holder 22 is formed into a U-shape with a surface opposed to the oil pump body 15 being open, so that the harness 21 can be accommodated in the harness holder 22 (see FIG. 8). Elliptic openings $22_1$ are provided at a plurality of lengthwise points in the harness holder 22, and locking projections $22_2$ are provided in the vicinity of the openings $22_1$ for retaining the harness 21 to prevent the harness 21 from dropping (see FIG. 7).

Figure 4:
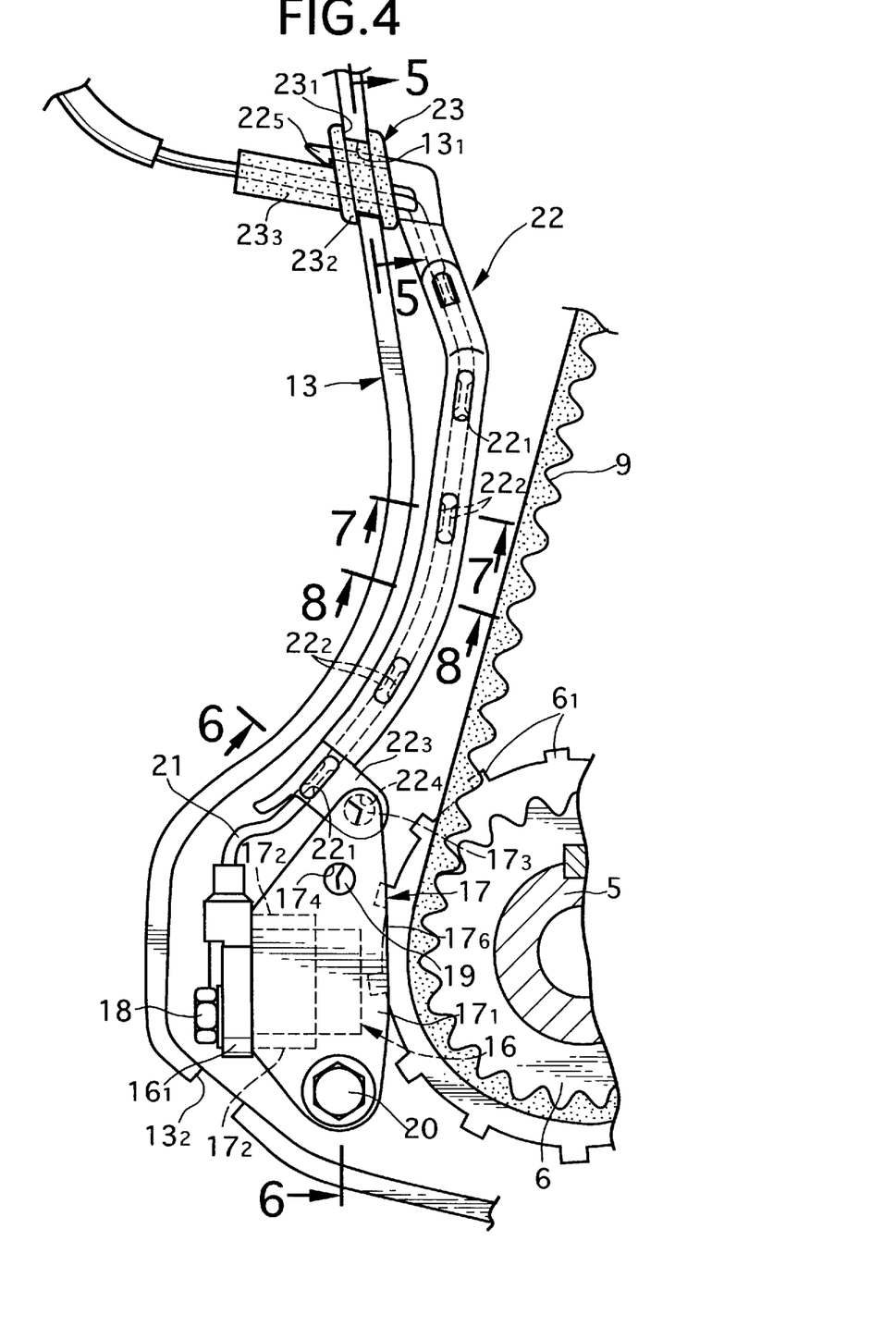
FIG. 4 is an enlarged view of an essential portion of FIG. 2.
Figure 5:
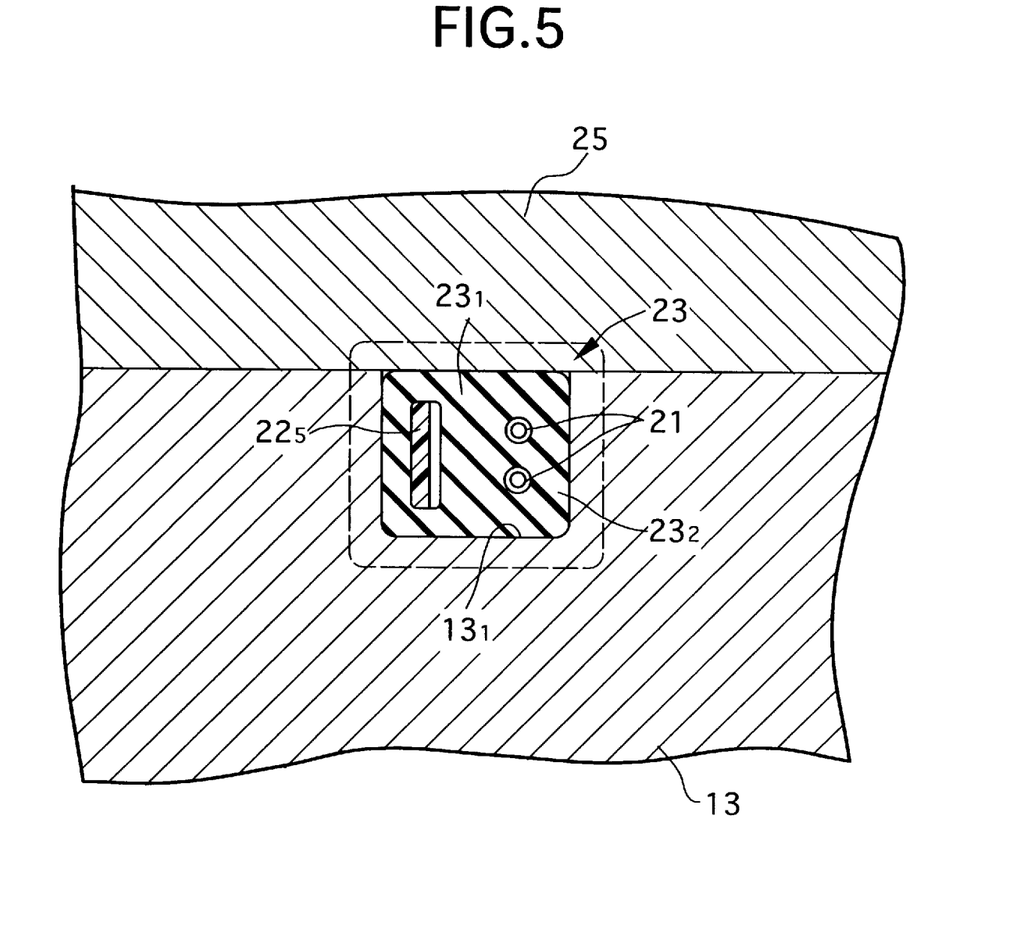
FIG. 5 is an enlarged sectional view taken along a line 5—5 in FIG. 4.
Figure 6:
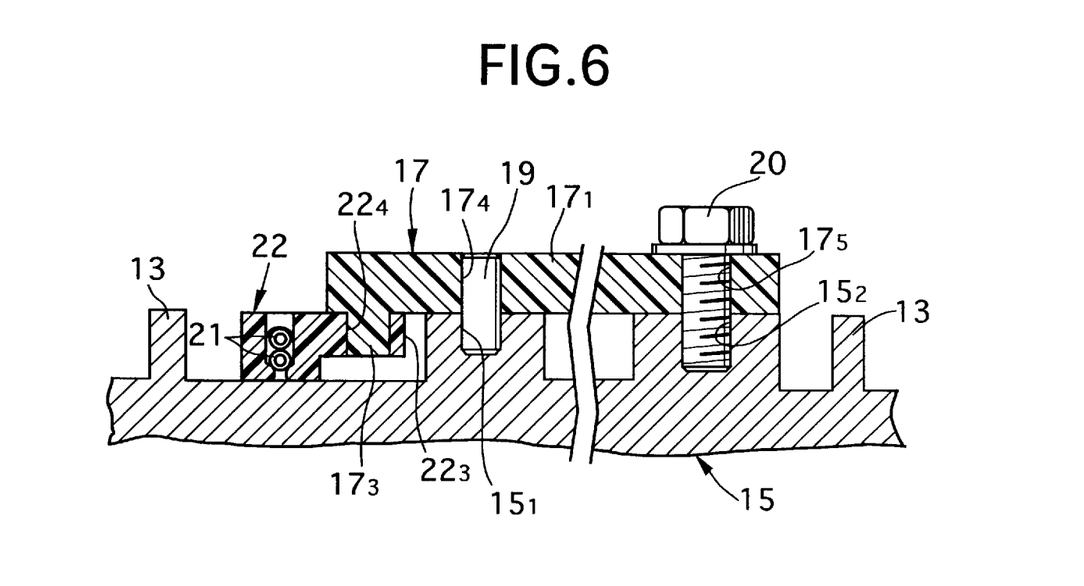
FIG. 6 is an enlarged sectional view taken along a line 6—6 in FIG. 4.
Figure 7:
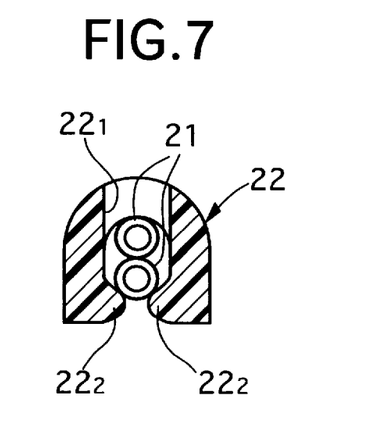
FIG. 7 is an enlarged sectional view taken along a line 7—7 in FIG. 4.
Figure 8:
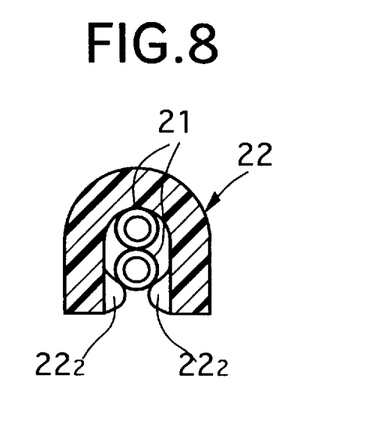
FIG. 8 is an enlarged sectional view taken along a line 8—8 in FIG. 4.

As is clear from FIGS. 4 to 6, a mounting plate $22_3$ is integrally and projectingly provided at one end of the harness holder 22, and a locking pin $17_3$ integrally formed on the sensor holder 17 is fitted into a pin bore $22_4$ defined in the mounting plate $22_3$. As is clear from FIG. 6, the harness holder 22 is positioned by fitting the locking pin $17_3$ into the pin bore $22_4$. Further, the movement of the harness holder 22 in an upward direction in FIG. 6 is prevented by abutment against the base plate $17_1$ of the sensor holder 17, and the movement of the harness holder 22 in a downward direction in FIG. 6 is prevented by abutment against the oil pump body 15.

As is clear from FIGS. 4 and 5, a locking claw $22_5$ extending in the same direction as the harness 21 is integrally and projectingly provided at the other end of the harness holder 22. The locking claw $22_5$ passes through a body portion $23_2$ of a grommet 23 made of a rubber with a groove $23_1$ thereof fitted into the notch $13_1$ in the timing belt cover coupling portion 13, thereby locking the other end of the harness holder 22 to the timing belt cover coupling portion 13 through the grommet 23. The harness 21 passes through the body portion $23_2$ of the grommet 23 and the inside of a harness guide portion $23_3$ to the outside of the timing belt cover coupling portion 13. The grommet 23 constitutes a resilient seal member of the present invention.

As can be seen from FIG. 5, the body portion $23_2$ of the grommet 23 is formed into a substantially square shape in cross section, and the locking claw $22_5$ of the harness holder 22 passing through the body portion $23_2$ is formed into a flat rectangular shape in cross section. The locking claw $22_5$ of the harness holder 22 is offset to one side of the center of the body portion $23_2$ of the grommet 23, and the two lead wires of the harness 21 pass through the other side of the center of the body portion $23_2$. The cross sections of the two lead wires of the harness 21 are disposed to extend along a longer side of the rectangular cross section of the locking claw $22_5$, i.e., at an equal distance from such longer side. Thus, the locking claw $22_5$ and the two lead wires of the harness 21 can be disposed in a compact manner within the cross section of the body portion $23_2$ of the grommet 23, thereby miniaturizing the grommet.

By using the harness holder 22 in the above manner, the harness 21 can be reliably supported and prevented from contacting the driving-force transmitting means. Also, by supporting the locking claw $22_5$ provided at the other end of the harness holder 22 using the grommet 23 mounted in the notch $13_1$ in the timing belt cover coupling portion 13 to guide the harness 21, the harness holder 22 can be fixed without using a special fixing member such as a bolt, thereby making the engine E compact, as well as facilitating the assembly thereof due to a reduction in the number of parts. The process of locking the locking claw $22_5$ of the harness holder 22 to the grommet 23 is extremely easy, because the grommet 23 made of a rubber is resiliently deformable.

Moreover, the harness holder 22 and the grommet 23 are joined together in advance of being assembled to the engine E, and the harness 21 is inserted through the harness holder 22 and the grommet 23. Therefore, there is no possibility that the harness 21 protrudes from between the harness holder 22 and the grommet 23 and interferes with other members during transportation before assembly and after assembly. In addition, even in a state in which the timing belt cover 25 is mounted, the tip end of the locking claw $22_5$ of the harness holder 22 covered with the timing belt cover 25 passes through the grommet 23 and is visible from outside of the cover. Therefore, the mounted state of the harness holder 22, namely, whether the harness 21 is reliably supported, can be easily checked from outside without removing the timing belt cover 25.

By locking the locking claw $22_5$ of the harness holder 22 to the grommet 23 in the state in that the locking claw $22_5$ passes through the grommet 23 in the above manner, it is possible to reduce the number of parts for supporting the harness holder 22 and confirm the mounted state of the harness holder 22.

As is clear from FIG. 4, a water-draining notch $13_2$ is defined in a lowest end of the timing belt cover coupling portion 13 in the vicinity of the crank angle sensor 16. The notch $13_2$ is also effective for a ventilation between the inside and outside of the timing belt cover coupling portion 13 and can contribute to the cooling of the crank angle sensor 16. A belt guide surface $17_6$ curving smoothly is formed on the base plate $17_1$ of the sensor holder 17 in an opposed relation to the outer surface of the timing belt 9 with a small gap left therebetween. The belt guide surface $17_6$ enables the timing belt 9 to be guided smoothly while preventing the timing belt 9 from skipping the teeth of the driving pulley 6. Further, the timing belt cover coupling portion 13 and the harness holder 22 curve inwards toward the timing belt 9 and hence, an oil filter 24 can be disposed compactly by utilizing a space defined outside the timing belt cover coupling portion 13 and the harness holder 22.

Figure 9:
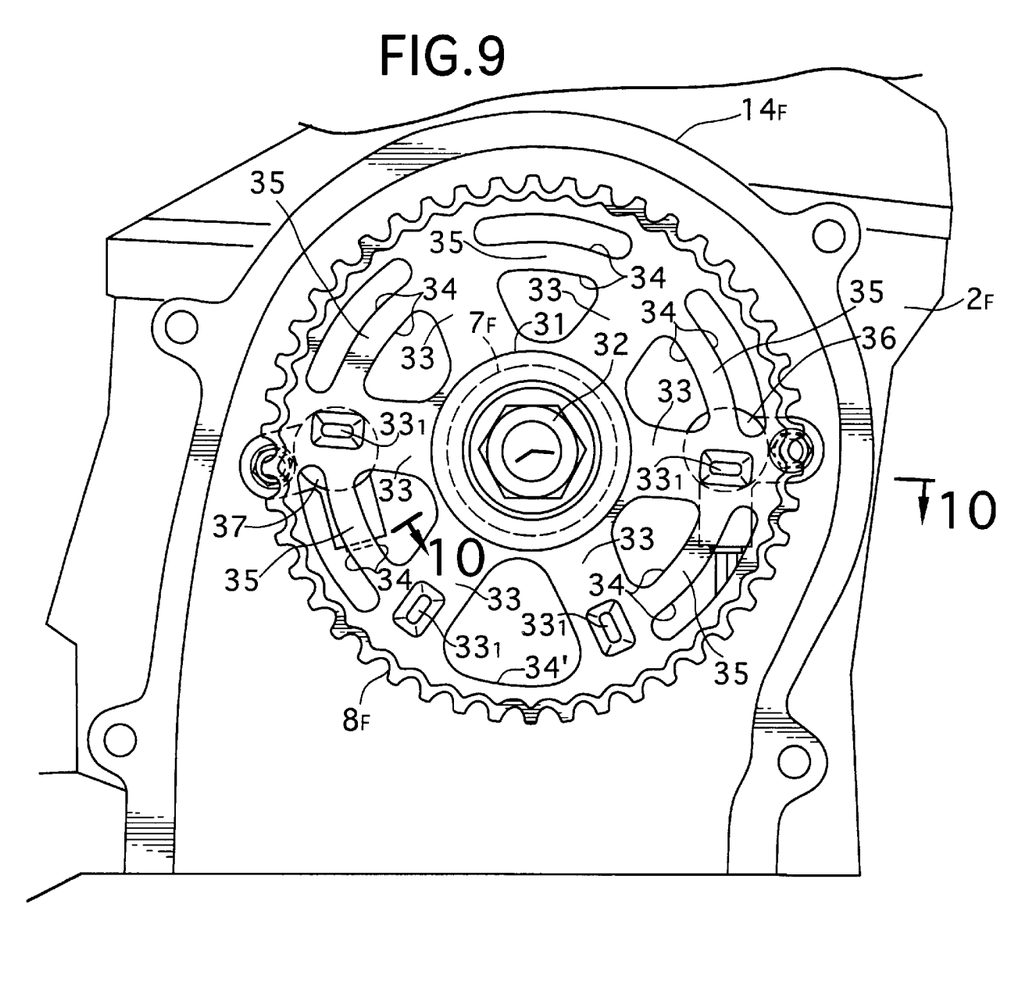
FIG. 9 is an enlarged view of the essential portion of FIG. 1.
Figure 10:
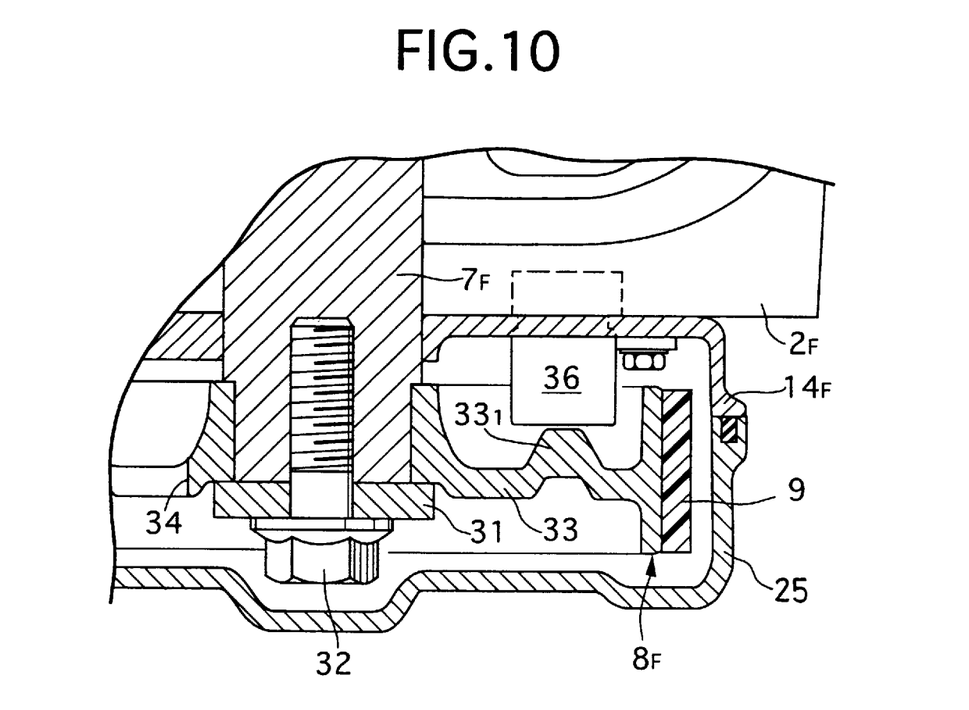
FIG. 10 is a sectional view taken along a line 10—10 in FIG. 9.

A structure of a TDC detecting mechanism mounted on the cam shaft $7_F$ will be described below with reference to FIGS. 1, 9 and 10. The timing belt cover 25 (see FIG. 10) and the timing belt 9 are not shown in FIG. 9.

The cam pulley $8_F$ fixed to an end of the intake-side cam shaft $7_F$ by a washer 31 and a bolt 32 includes six spoke portions 33 disposed radiately at distances of 60° from each other, and six lightening bores 34 and 34' defined between the spoke portions 33. The five lightening bores 34 excluding the single lightening bore 34' are bisected into radially inner and outer ones by ring portions 35 which are arcuate about an axis of the cam shaft $7_F$. Four detected projections $33_1$ are projectingly provided on backs (i.e., surfaces opposed to the cylinder head $2_F$) of four of the spoke portions 33, so that they are located on a circle concentric with the ring portions 35. Two TDC (top dead center of a piston) sensors 36 and 37 are provided so that they are located on a diametrical line extending through the axis of the cam shaft $7_F$ and are opposed to the detected projections $33_1$. The two TDC sensors 36 and 37 are fixed to a timing belt back cover $14_F$ (which corresponds to a timing belt cover coupling portion) fixed to the cylinder head $2_F$ and hence, it is easy to mount the two TDC sensors 36 and 37.

Thus, when the cam pulley $8_F$ rotates along with the cam shaft $7_F$, the four detected projections $33_1$ pass in front of the two TDC sensors 36 and 37 at a predetermined timing, and TDC is detected based on such timing. At this time, even if the height of the detected projections $33_1$ is relatively small, the spoke portions 33 having no detected projections $33_1$ provided thereon cannot be recognized as the detected projections $33_1$ by mistake, because the ring portions 35 are provided. This contributes to an enhancement in detecting accuracy by the TDC sensors 36 and 37 and making the engine E compact. Moreover, the spoke portions 33 are connected by the ring portions 35, leading to an enhanced rigidity of the cam pulley $8_F$, and an enhanced accuracy of detection by the TDC sensors 36 and 37.

The reason why the ring portion 35 is not provided through the single lightening bore 34' is that the weight of one side of the diametrical line of the cam pulley $8_F$ provided with the four detected projections $33_1$ is larger than the weight of the other side and for this reason, the weight on the one side is decreased by omitting of the ring portion 35 to make the weight balance of the cam pulley $8_F$ circumferentially uniform.

Figure 11:
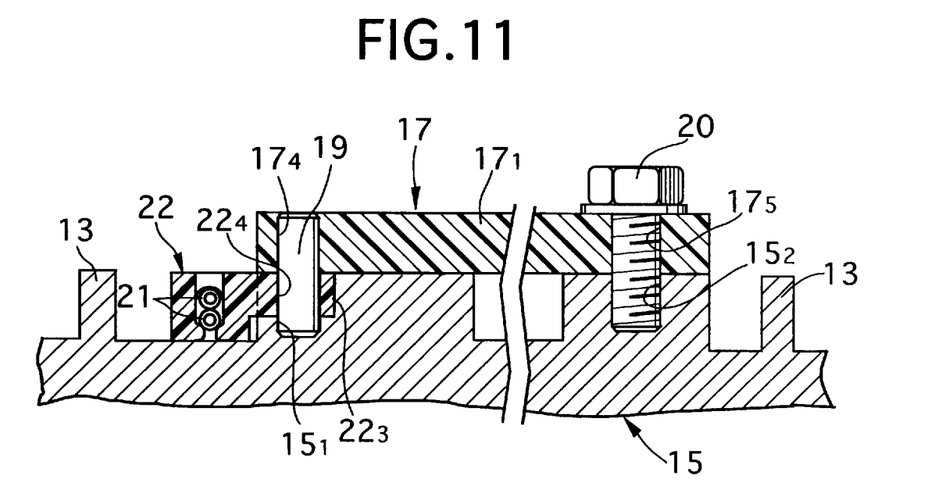
FIG. 11 shows a second embodiment of the present invention and corresponds to FIG. 6.

FIG. 11 illustrates a second embodiment of the present invention. The second embodiment is characterized by the structure of positioning and fixing the harness holder 22 by the sensor holder 17. More specifically, although the pin bore $22_4$ in the harness holder 22 is locked by the locking pin $17_3$ of the sensor holder 17 in the first embodiment, the locking pin $17_3$ is not used in the second embodiment because the positioning pin 19 is moved from its location in the first embodiment such that it functions not only for positioning the sensor holder base plate $17_1$ relative to the oil pump body 15, but also functions to lock the harness holder 22 relative to the sensor holder 17. Thus, it is possible to simplify the shape of the harness holder 22 to reduce the cost of manufacturing and assembling same.

Although the presently preferred embodiments of the present invention have been described in detail, it will be understood that the present invention is not limited to the above-described embodiments, and various modifications and variations may be made thereto without departing from the spirit and scope of the invention defined in the claims appended hereto.

For example, although the grommet 23 is mounted to the timing belt cover coupling portion 13 in the embodiments, the grommet 23 may be mounted to the timing belt cover 25, or may be mounted to extend astride both the timing belt cover coupling portion 13 and the timing belt cover 25. The harness 21 may not be limited to be connected to the crank angle sensor 16, but may be a harness for any other applications. Also, the driving-force transmitting means may not be limited to the driving pulley 6 and the timing belt 9. The timing belt cover 25 may be made of a resin or a metal.

What is claimed is:

1. A harness holder fixing structure in an engine including a harness disposed to extend inside and outside a cover member which covers a driving-force transmitting means for transmitting a driving force of a crankshaft, wherein a harness holder for supporting said harness is disposed within the cover member, and said harness holder is provided with a locking portion operatively engaged with said cover member.

2. A harness holder fixing structure in an engine according to claim 1, wherein said locking portion provided on said harness holder is exposed outside of said cover member.

3. A harness holder fixing structure in an engine according to claim 1, wherein said locking portion provided on said harness holder is locked to said cover member with a resilient seal member interposed therebetween.

4. A harness holder fixing structure in an engine according to claim 3, wherein said harness passes through said resilient seal member.

5. A harness holder fixing structure in an engine according to claim 4, wherein said resilient seal member has a rectangular sectional shape.

6. A harness holder fixing structure in an engine according to claim 5, wherein cross sections of a plurality of lead wires of the harness are disposed to extend along a longer side of the rectangular cross section of said locking portion in a cross sectional area where the locking portion of said harness holder and the harness pass through said resilient seal member.

7. A harness holder fixing structure in an engine according to claim 1, wherein said locking portion is provided at one end of said harness holder, and the other end of said harness holder is connected to a sensor holder for retaining a sensor.

8. A harness holder fixing structure in an engine according to claim 7, wherein said sensor is a crank angle detecting sensor, and said sensor holder has a guide surface formed thereon for guiding said driving-force transmitting means.

9. A harness holder fixing structure in an engine according to claim 7, wherein said cover member has a water-draining notch provided therein below said sensor.

10. A harness holder fixing structure in an engine according to claim 1, wherein a central portion of said harness holder curves in a recessed shape in a direction toward said driving-force transmitting means, and said engine further includes an oil filter disposed in an opposed relation to said recessed portion.

11. A harness holder fixing structure in an engine according to claim 1, wherein said harness holder has a U-shaped cross section, which opens toward a body of the engine so that said harness is received therein, and said harness holder has a locking projection for supporting said harness therein.

12. A harness holder fixing structure in an engine including a harness disposed to extend inside and outside a cover member which covers a driving-force transmitting means for transmitting a driving force of a crankshaft, wherein a harness holder for supporting said harness is disposed within the cover member, said harness holder has a locking portion operatively engaged with said cover member with a resilient seal member interposed therebetween, said locking portion is exposed outside of said cover member, and said harness passes through said resilient seal member.

13. A harness holder fixing structure in an engine according to claim 12, wherein said harness holder locking portion is provided at one end thereof, and the other end of said harness holder is connected to a sensor holder for retaining a sensor.

14. A harness holder fixing structure in an engine according to claim 13, wherein said sensor is a crank angle sensor for sensing a crank angle of the crankshaft and said harness is connected to the crank angle sensor.

15. A harness holder fixing structure in an engine according to claim 13, wherein said other end of said harness holder is connected to said sensor holder by a pin extending into a bore defined in the harness holder.

16. A harness holder fixing structure in an engine according to claim 15, wherein said pin also connects the sensor holder to the engine.

17. A harness holder fixing structure in an engine according to claim 13, wherein said sensor holder has a guide surface formed thereon for guiding said driving-force transmitting means.

18. A harness holder fixing structure in an engine including a harness disposed to extend inside and outside of a cover member which covers a driving-force transmitting member for transmitting driving force of a crankshaft, the fixing structure comprising:

a harness holder supporting the harness and disposed within the cover member; and said harness holder being provided with means for locking the harness holder in operative engagement with the cover member.

19. A harness holder fixing structure in an engine according to claim 18, wherein said locking means includes a resilient seal disposed between the cover member and the harness, and a locking projection on the harness holder and in locking engagement with the resilient seal.

20. A harness holder fixing structure in an engine according to claim 19, wherein said locking projection of the harness holder is exposed outside of the cover member.

* * * * *